Oct. 17, 1967

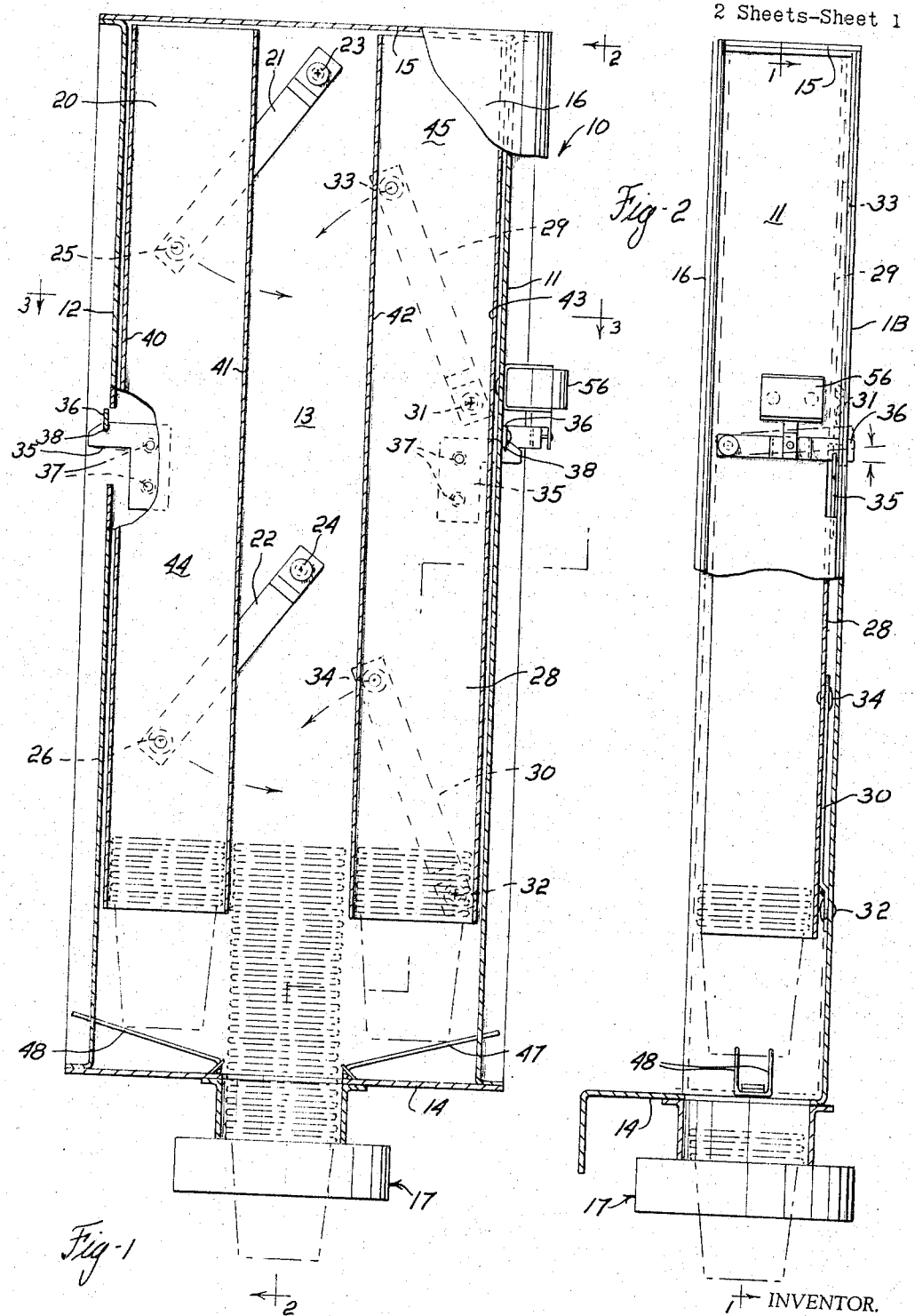

J. H. KOPERA 3,347,413

ARTICLE DISPENSER WITH AUTOMATIC REPLACEMENT
OF DEPLETED STACK WITH A SIMILAR STACK

Filed April 25, 1966

INVENTOR.
JOHN H. KOPERA
BY
Synnestvedt & Lechner
ATTORNEYS

United States Patent Office 3,347,413
Patented Oct. 17, 1967

3,347,413
ARTICLE DISPENSER WITH AUTOMATIC REPLACEMENT OF DEPLETED STACK WITH A SIMILAR STACK
John H. Kopera, Trenton, N.J., assignor to Rudd-Melikian, Inc., Warminster, Pa., a corporation of Pennsylvania
Filed Apr. 25, 1966, Ser. No. 544,762
9 Claims. (Cl. 221—11)

ABSTRACT OF THE DISCLOSURE

Article dispenser especially for vending machine drinking cups. Vertical stacks of cups stored in magazines and movable in sequence to a common dispensing station by mechanism, e.g. parallel linkage mechanism and control circuit.

---

This invention relates to article dispensing and more particularly to apparatus for dispensing articles from vertically arranged stacks.

While not limited thereto, the invention is especially well-suited to be used in the dispensing of articles such as cups in coin-operated vending machines and is concerned with an arrangement which provides for storage and delivery of an unusually large number of cups to a central cup dispensing station. The problem of maintaining adequate supplies of cups in vending machines has been a constant headache to servicing and supplying personnel since the machines produce no revenue when the cups are used up. The present invention replaces the rather complex and bulky mechanisms currently in use and has, as its primary object, the provision of a highly effective and compact storage device for insuring that a supply of cups, adequate to meet most conditions of demand, will be available.

A related object of the invention is the provision of a dispenser for cups or other articles which possesses the simplicity and reliability required of vending machine equipment.

Another object of the invention is the provision of a dispenser for cups or other articles which is easily reloaded when the supply of cups is exhausted.

The foregoing and various other objects of the invention which will appear hereinafter, are achieved by a novel arrangement of apparatus at a central dispensing station, which includes a magazine for supporting a column of articles to be dispensed at said station, a storage magazine on at least one side of said dispensing station, means mounting the storage magazines for movement to the dispensing station, and means connected to the storage magazines and operative when the supply of articles at the dispensing station drops below a predetermined level to sequentially release the storage magazines for movement to the dispensing station.

The manner in which the various objects of the invention are achieved will be apparent upon reference to the following detailed description of an illustrative embodiment of the invention shown in the accompanying drawings in which:

FIGURE 1 is an elevational view, taken along section line 1—1 of FIGURE 2, illustrating the preferred embodiment of the invention;

FIGURE 2 is a side view in section, taken along line 2—2 of FIGURE 1;

Figure 3:
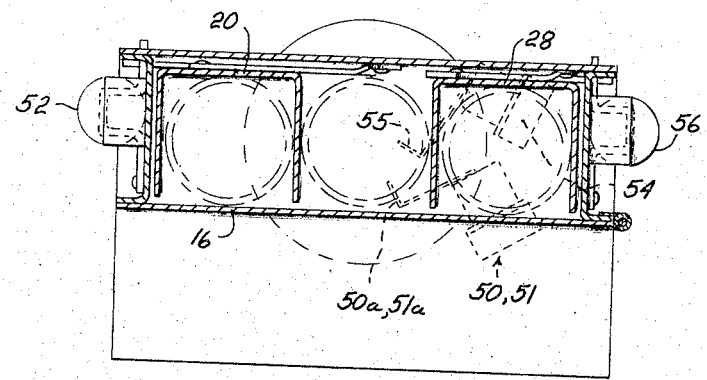
FIGURE 3 is a plan sectional view of the apparatus, taken on line 3—3 of FIGURE 1.
Figure 4:
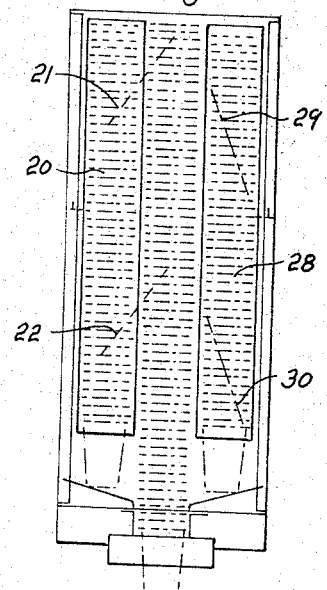
FIGURES 4, 5 and 6 are schematic views showing the various positions the apparatus assumes during the course of operation.

Attention is now directed to FIGURE 1, wherein dispensing and storage apparatus formed in accordance with the principles of the invention is mounted in a cabinet 10. The cabinet may be fabricated of sheet metal and provided with side walls 11 and 12, a rear wall 13, a bottom wall or floor 14 and a top 15. Typically, a door, a fragment of which is shown at 16 at the upper right hand corner of FIGURE 1, provides access to the interior of the cabinet and is hinged to a side wall 11 or 12.

Mounted at the bottom of the cabinet, at a central dispensing station, is a cup drop or dispenser 17. Dispenser 17 may take various forms as will be appreciated by those skilled in this art. It is preferably of the type which has a plurality of rotary cams having inclined camming grooves which move to engage the rim of the bottom cup in a stack when a coin is deposited in the machine, separating that cup from the stack and dropping it down onto a platform below the dispenser where it is filled with the beverage selected by the consumer.

The storage and dispensing apparatus of the preferred embodiment of the invention delivers cups to the cup dispenser 17 from three vertically arranged columns. As illustrated in FIGURE 1, for purposes of clarity of illustration, only a few cups are shown in each column. It should be understood, however, that normally the columns would extend to a point adjacent the top of the cabinet 10.

One stack or column of cups is stored in a storage magazine 20 which is mounted for movement by means which preferably includes a parallel linkage mechanism comprised of a pair of links 21 and 22. Each of the links is pivotally mounted on the rear wall 13 by means of rivets or pivot pins 23 and 24, respectively, the pins 23 and 24 being preferably in substantial alignment with the axis of the cup drop 17. These links are pivotally connected to the rear wall of magazine 20 at points equally spaced from pins 23 and 24 by pivot pins 25 and 26. The parallel linkage mechanism provides for movement of the magazine 20 by gravity from the position shown in FIGURE 1 to a position of co-axial alignment with the central dispensing station. The linkage mechanism maintains the magazine in a vertical plane when it is in the position shown in FIGURE 1 and in the position of alignment with the station.

In like manner, a second storage magazine 28 is mounted for movement from a position on the opposite side of the central dispensing station to a position of co-axial alignment with the dispensing station by a movable mounting means which preferably comprises a second parallel linkage mechanism, including links 29 and 30. Links 29 and 30 are pivotally mounted on pins 31 and 32 which are secured to the rear wall 13 of the cabinet at points on a line laterally offset from the axis of the cup drop 17. Pivot pins 33 and 34 pivotally connect the upper ends of the links to the magazine, thereby completing the linkage mechanism.

The magazines 20 and 28 are normally latched in their positions on each side of the central dispensing station. For this purpose, latch plates 35 are mounted on the magazines by any convenient means, such as rivets 37. Keeper bars 36, one of which may be seen in FIGURE 2, are engageable with notches 38 in the latch plates in order to hold the magazines in their retracted position. Means described hereinafter move the keeper bars out of the notches 38 in the latch plates at the desired points during the sequence of dispensing operations.

Due to the location of the pivot pins for the parallel links, a storage magazine 20 or 28 will swing by gravity to the central dispensing station whenever the keeper for that magazine is moved out of the notch in its latch plate.

According to the preferred form of the invention, the storage magazines 20 and 28 are elongated U shaped channel-like members whose side flanges 40, 41, 42 and 43 and webs 44 and 45 support and guide columns of cups. Inclined support plates 47 and 48 provide a bottom support for the cups in the magazines 20 and 28.

The cabinet rear wall 13, and the outer surfaces of the flanges 41 and 42 provide support for a third or central column of cups at the central dispensing station and, thus, this structure may be said to form a third magazine.

Figure 7:
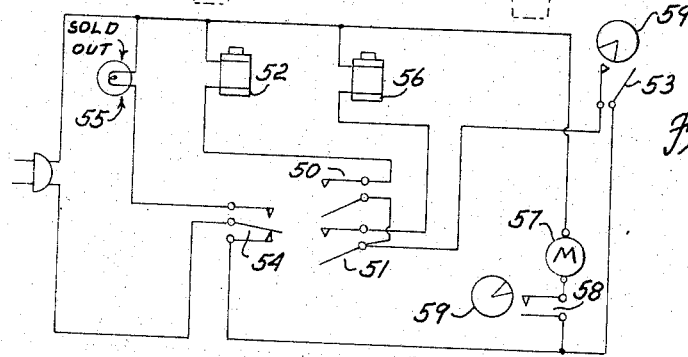
FIGURE 7 is a schematic wiring diagram illustrating control circuits used in conjunction with the preferred form of the invention.

Attention is now directed to FIGURES 3 and 7. In order to control the transfer action of the magazines, I provide cup sensing mechanism including a pair of pressure sensitive micro-switches 50 and 51, the switch 51 being located directly beneath the switch 50 shown in FIGURE 3. These switches are provided with flexible arms 50a and 51a which are moved inwardly from the position shown in FIGURE 3 to close the switches by cups in the cup drop 17. As may be seen from FIGURE 7, the switch 50 is in series with the power supply, a solenoid 52, a cam controlled program switch 53, "sold out" switch 54 and the other side of the power supply.

Switch 54 is a pressure sensitive micro-switch, located at the dispensing station and is provided with an arm 55 which maintains the switch in the position shown in FIGURE 7 whenever cups are located in the cup drop. Whenever the supply of cups is exhausted, the switch 54 moves to the upper position in which a "sold out" light 55 is connected to the power supply. Other circuitry, including a coin-return circuit, not shown, may also be controlled by the switch 54 for operation when the supply of cups is exhausted.

A second solenoid 56 is connected in parallel with the solenoid 54 and this is connected to the other side of the power supply by means of the pressure sensitive micro-switch 51, the program switch 53 and the "sold out" switch 54.

A cup dispensing motor 57 is also connected across the power supply if a motor driven cup drop is used. The motor is energized through a switch 58. A cam, shown schematically at 59, is controlled by conventional coin-actuated mechanism, not shown, and closes the switches 53 and 58 when a coin is inserted in the vending machine.

As shown in FIGURES 1 through 3 of the drawings, the solenoids 52 and 56 are mounted on the cabinet side walls 12 and 11 respectively, and are connected to the keepers 36 so that each keeper is lifted out of the notch in its latch plate when that particular solenoid is energized.

Figure 5:
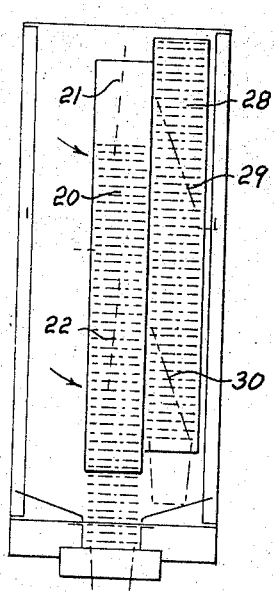

The operation of the apparatus will now be described, special reference being made to FIGURES 4 through 7 of the drawings. The three magazines are each initially loaded with a stack of cups, as may be seen in FIGURE 4. The fingers 50a, 51a and 55 associated with the switches 50, 51 and 54 are pressed inwardly by the lower-most cups at the central dispensing station, and in that position hold the switches in the positions shown in FIGURE 7. Cups are thereafter first dispensed from the central column. When the supply of cups from that column drops below a predetermined level, the sensing finger 50a responds to the absence of a cup at the predetermined level and the switch closes. Switch 53 closes due to the deposit of a coin in the vending machine and a circuit is completed to the solenoid 52 through the switch 50, switch 53 and the switch 54. Solenoid 52 is thereby energized, the latch for the left hand magazine 20 is released and the magazine swings down by means of its parallel linkage mechanism to the central dispensing position as is shown in FIGURE 5. The supply of cups in the left hand magazine now occupies the space previously occupied by the first column of cups, and switch 50 again opens.

Figure 6:
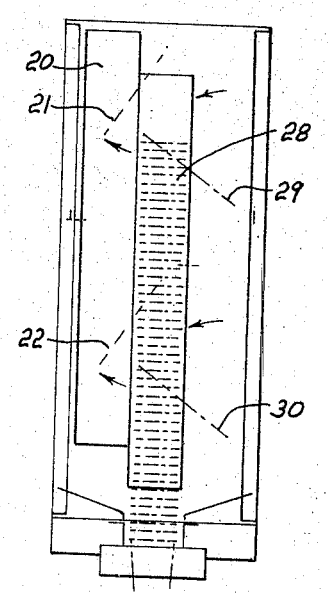

The cups are now dispensed from the magazine 20 until the supply of cups in that magazine drops below a predetermined level, that is, the level at which the switch 51 closes. When this occurs, solenoid 56 is energized and magazine 28 is freed to move to the central position as is shown in FIGURE 6.

Attention is now directed to the location of the pivot points for the parallel linkage mechanisms. It is to be noted that the links 29 and 30 are mounted on the rear wall 13 at points below the pivot pins on the magazine 28 and that these pivot points are also located below the pivot points 23 and 24 for the magazine 20. This arrangement provides a simple means of returning the magazine 20 to its latched position, since the weight of the loaded magazine 28 is sufficient when the links are so arranged to move the magazine 20 aside.

It may be seen from the foregoing that the present invention provides a dispenser which is particularly well-suited for vending machine installations. Among the special features of the invention are the provision of mechanism for the substantially instantaneously shifting of the magazines to the dispensing station and the provision of means to return a first supply magazine to its original position when the supply therein is exhausted. Since the unit is gravity operated except for the latch mechanisms 35, the use of complex drive means is eliminated so that the unit is highly reliable and substantially maintenance free.

I claim:

1. A dispenser for sequentially dispensing articles at a central dispensing station, said articles being arranged in vertically oriented columns, a first of said columns being positioned at said central dispensing station and the second and third of said columns being positioned on opposite sides of said station, first and second storage magazines for storing said second and third columns of articles, means mounting said first magazine for movement to the said station when the first column of articles drops to a predetermined level, means mounting said second magazine for movement to said station when the column of articles in the first storage magazine drops to a predetermined level and means to return the first magazine to its position on one side of said dispensing station upon movement of said second magazine to said dispensing station.

2. Apparatus according to claim 1 wherein each of said magazine mounting means includes mechanism supporting said magazines for movement by gravity to the dispensing station and further includes latches for retaining each magazine in its position beside the dispensing station.

3. Apparatus according to claim 2 wherein said magazine mounting means includes a pair of parallel links for each of said magazines, and connections pivotally mounting said links on said magazines and said apparatus frame for movement of the magazines by gravity to said station.

4. Apparatus according to claim 3 further including a first solenoid connected to said first latch, a pressure sensitive switch at said dispensing station and operative when the supply of articles in the first column drops below a predetermined level to energize said first solenoid to release said first latch, a second solenoid connected to said second latch and a second pressure sensitive switch at said dispensing station and operative when the supply of articles in the second column drops below a predetermined level to energize said second solenoid to release the second latch.

5. Apparatus according to claim 3 further including a first solenoid connected to said first latch, a pressure sensitive switch engageable by articles at said dispensing station and responsive to the absence of an article adjacent said switch to energize said first solenoid to release said first latch, a second solenoid for operating said second latch and a second pressure sensitive responsive switch engageable by articles at said dispensing station and responsive to the absence of an article adjacent said switch to energize said second solenoid to release said second latch.

6. Apparatus according to claim 5 wherein the pivotal connections for said links are positioned with respect to each other and the relative weights of the magazines are such that movement of the loaded second magazine to the station returns the first magazine to its position on one side of the station.

7. Apparatus according to claim 1 wherein said articles are cups.

8. In combination with mechanism for dispensing articles from a column of articles at a dispensing station, a storage magazine for storing a second column of articles on one side of said dispensing station, a parallel linkage mechanism mounting said magazine for movement to the dispensing station, a latch mechanism for restraining movement of said magazine to the dispensing station, and means connected to said latch mechanism and responsive to the dispensing of the last article of the column of articles located at the dispensing station for releasing said storage magazine for movement to the dispensing station.

9. Apparatus according to claim 8 further including a second storage magazine, said second magazine being located on the opposite side of the dispensing station with respect to the first magazine, a parallel linkage mechanism mounting said second magazine for movement to said dispensing station, second latch mechanism for restraining movement of the second magazine to the dispensing station and means responsive to the dispensing of the last article from the first magazine for operating said second latch mechanism to release the second magazine for movement to the dispensing station, said linkages being positioned with respect to each other whereby the loaded second magazine returns the emptied first magazine to its latched position.

References Cited

UNITED STATES PATENTS

| 2,869,754 | 1/1959 | Booth et al. | 221—11 |
| 3,053,599 | 9/1962 | Mortara | 221—11 X |
| 3,279,650 | 10/1966 | Maxwell | 221—11 |

FOREIGN PATENTS 99,491    10/1961    Netherlands.

SAMUEL F. COLEMAN, *Primary Examiner.*